United States Patent [19]

Kato et al.

[11] Patent Number: 4,604,716
[45] Date of Patent: Aug. 5, 1986

[54] METHOD AND APPARATUS FOR CONTROLLING A ROBOT

[75] Inventors: Kanji Kato, Tokorozawa; Junichi Higashino, Kokubunji; Akisuke Naruse, Hitachi, all of Japan

[73] Assignee: Hitachi, Ltd., Tokyo, Japan

[21] Appl. No.: 559,090

[22] Filed: Dec. 7, 1983

[30] Foreign Application Priority Data

Dec. 10, 1982 [JP] Japan ................................. 57-215425

[51] Int. Cl.$^4$ ...................... G09C 00/00; G05B 11/32; G05B 19/10
[52] U.S. Cl. .................................... 364/513; 364/167; 364/174; 364/192; 318/567; 318/568; 318/625
[58] Field of Search ............... 364/513, 474, 475, 167, 364/174, 191, 192, 193; 318/567, 568, 625; 901/9, 15, 20

[56] References Cited

U.S. PATENT DOCUMENTS

| | | | |
|---|---|---|---|
| 3,909,600 | 9/1975 | Hohn | 901/15 X |
| 3,941,988 | 3/1976 | Hagstrom | 364/174 X |
| 4,008,829 | 2/1977 | Chandra et al. | 364/174 X |
| 4,021,650 | 5/1977 | Ruble | 364/167 |
| 4,245,298 | 1/1981 | Slater | 364/167 X |
| 4,296,473 | 10/1981 | Imazeki et al. | 364/474 X |
| 4,453,221 | 6/1984 | Davis et al. | 364/513 |
| 4,494,060 | 1/1985 | Chitayat et al. | 364/513 X |
| 4,510,565 | 4/1985 | Dummermuth | 364/167 X |
| 4,547,858 | 10/1985 | Horak | 364/513 |

Primary Examiner—Jerry Smith
Assistant Examiner—Jon D. Grossman
Attorney, Agent, or Firm—Antonelli, Terry & Wands

[57] ABSTRACT

A method for controlling a multi-joint robot having redundant operating joints, wherein joint velocities are calculated for non-redundant joints with redundant joints being fixed for each of at least a portion of the combinations of the non-redundant joints excluding redundant joints capable of attaining the movement of the robot end at a command velocity specified to the robot, by inverse-coordinate-transformation from the spatial coordinate to a joint coordinate inherent to the robot, on the basis of joint angles detected by an encoder mounted on the joints of the robot and the joint velocities are averaged or nearly averaged to obtain the average value or nearly average value as a desired joint velocity for the joints. The desired joint velocity is supplied to a velocity control unit of the robot as a controlled variable.

14 Claims, 5 Drawing Figures

METHOD AND APPARATUS FOR CONTROLLING A ROBOT

BACKGROUND OF THE INVENTION

The present invention relates to method and apparatus for controlling a robot arm with multi-degrees of freedom (hereinafter simply referred to as a robot), and more particularly to method and apparatus for controlling the robot to precisely and smoothly move an end of a robot arm with redundant degrees of freedom (hereinafter simply referred to as a redundant arm) along a desired trajectory.

In a trajectory control method to control the robot, a trajectory to which the end of the robot is to follow is appropriately interpolated and respective points on the trajectory defined by the interpolation are used as desired points, which are sequentially selected at a predetermined time interval to sequentially control the end of the robot along the desired trajectory. In order to position the end of the robot at the selected desired point, it is necessary to synergistically actuate joints of the robot. As the synergistic control method for the joints of the robot, the following method has been well known.

Let us consider a robot with 3-degrees of freedom which is commonly used to position the end of the robot at any position in a given space.

A position $X$ of the end of the robot in the working space represented by an orthogonal coordinate and at joint angle $\Theta$ of the robot represented by a coordinate inherent to the robot are expressed by:

$$X = (x\ y\ z)^T \tag{1}$$

$$\Theta = (\theta_1\ \theta_2\ \theta_3)^T \tag{2}$$

where the superscript T indicates the transpose of the row vector into a column vector.

From a geometrical structure of the robot, the robot end position $X$ is expressed by the joint angle $\Theta$ as $$X = F(\Theta) \tag{3}$$

Namely, the following relations exist.

$$\left.\begin{array}{l} x = f_1(\theta_1, \theta_2, \theta_3) \\ y = f_2(\theta_1, \theta_2, \theta_3) \\ z = f_3(\theta_1, \theta_2, \theta_3) \end{array}\right\} \tag{4}$$

where $$F = (f_1\ f_2\ f_3) \tag{5}$$

The transformation $F$ from the joint angle $\Theta$ represented by the coordinate inherent to the robot to the end position $X$ in the spatial coordinate is called a coordinate transformation.

By solving the simultaneous equations (4) for $\theta_1$, $\theta_2$ and $\theta_3$, the joint angle $\Theta$ for attaining the robot end position $X$ is determined.

That is, by solving the equations (4) for $\Theta$, we get $$\Theta = G(X) \tag{6}$$

that is, $$\left.\begin{array}{l} \theta_1 = g_1(x, y, z) \\ \theta_2 = g_2(x, y, z) \\ \theta_3 = g_3(x, y, z) \end{array}\right\} \tag{7}$$

where $$G = (g_1\ g_2\ g_3) \tag{8}$$

The transformation G from the robot end position $X$ represented by the spatial coordinate to the joint angle $\Theta$ in the coordinate inherent to the robot is called an inverse coordinate transformation.

The method for positioning the robot end position $X$ to the desired position by determining the joint angles $\Theta$ by the inverse coordinate transform equation (6) and controlling the joints of the robot to follow the angle is a most commonly known method.

In this control method, however, when the number of joints of the robot is larger than three, that is, when redudant joints are included, the coordinate transform function $F$ is represented as $$x = f_1(\theta_1, \theta_2, \theta_3, \theta_4, \ldots, \theta_n)$$

$$y = f_2(\theta_1, \theta_2, \theta_3, \theta_4, \ldots, \theta_n)$$

$$z = f_3(\theta_1, \theta_2, \theta_3, \theta_4, \ldots, \theta_n) \tag{9}$$

where n is the number of joints. Since the number of unknown quantities is n ($n \geq 4$) while the number of equations is three, the joint angle $\Theta$ is not uniquely defined for the robot end position $X$. In order to resolve the above problem, n-3 of the n joints may be fixed and the simultaneous equations (9) may be solved for the three joints to determine the joint angles of the robot. In this method, in order to determine which joints should be fixed and which joints should be operated to position the robot end to the desired position, an operation time required for positioning and a power consumed etc., are used as an evaluation function, and a combination of joints which minimizes the evaluation function is determined. This evaluation function is usually complex, and non-linear simultaneous equations including trigonometrical functions must be solved to determine the inverse coordinate transform function for each set of joints to be fixed. Accordingly, the calculation is very complex.

Further, it is a common method in prior art to obtain a specified robot end velocity from joint velocities of the robot by inverse-coordinate transforming the relation between the velocity of the robot end and the joint velocities, which relation is obtained by differentiating the equation (3) with respect to time, when there are no redundant joints in the robot. The equation which represents the robot end velocity by the joint velocity is locally a linear equation without regard to a mechanical structure of the robot. However, when the redundant joints are included, a matrix of equations representing the robot end velocity by the joint velocity is non-square. Although an inverse matrix of the non-square matrix can be obtained by an approximation function, the calculation of the approximation function is complex and time-consuming. Therefore, when a simple controller having a microcomputer as a data processing unit is used, it is practically difficult to real-time control the robot.

SUMMARY OF THE INVENTION

It is an object of the present invention to provide a method and apparatus for controlling redundant robot arms, which enable smooth and precise continuous trajectory control with a relatively simple calculation process without being affected by a mechanical structure of a robot and without using a complex evaluation function.

In the control of the redundant robot arm in accordance with the present invention, a relation between an arm end position $\mathbb{X}$ $(x\ y\ z)^T$ represented by a spatial coordinate determined by a geometrical structure of the robot arm and n joint angles $\dot{\Theta}$ $(\theta_1\ \theta_2\ \ldots\ \theta_n)^T$ represented by a coordinate, inherent to the robot, that is, $$\mathbb{X} = \mathbb{F}(\theta) \tag{10}$$

is differentiated with time t to derive a velocity relation $$\dot{\mathbb{X}} = \mathbb{J}\ \dot{\Theta} \tag{11}$$

where $$\mathbb{J} = \mathbb{J}(\dot{\Theta}) = \begin{bmatrix} \frac{\partial f_1}{\partial \theta_1} & \frac{\partial f_1}{\partial \theta_2} & \frac{\partial f_1}{\partial \theta_3} & \cdots & \frac{\partial f_1}{\theta_n} \\ \frac{\partial f_2}{\partial \theta_1} & \frac{\partial f_2}{\partial \theta_2} & \frac{\partial f_2}{\partial \theta_3} & \cdots & \frac{\partial f_2}{\partial \theta_z} \\ \frac{\partial f_3}{\partial \theta_1} & \frac{\partial f_3}{\partial \theta_2} & \frac{\partial f_3}{\partial \theta_3} & \cdots & \frac{\partial f_3}{\partial \theta_z} \end{bmatrix} \tag{12}$$

$$\dot{\mathbb{X}} = \frac{\partial \mathbb{X}}{\partial t} \tag{13}$$

$$\dot{\Theta} = \frac{\partial \mathbb{\Theta}}{\partial t} \tag{14}$$

and the matrix $\mathbb{J}$ is squared by fixing n-3 redundant joints of the n joints so that the joint velocity $\dot{\Theta}$ is determined from the end velocity $\dot{\mathbb{X}}$, that is, an inverse matrix $\mathbb{J}^{-1}$ of the coordinate transform matrix $\mathbb{J}$ is obtained, and a velocity $\dot{\Theta}_k$ of a combination of the remaining three non-redundant joints is determined by $$\dot{\Theta}_k = \mathbb{J}_k^{-1}\ \dot{\mathbb{X}} \tag{15}$$

where $\mathbb{J}_k^{-1}$ is an inverse matrix of Jacobian $\mathbb{J}_k$ which relationalize the velocity $\dot{\Theta}_k$ of the combination of the operating joints with the end velocity $\dot{\mathbb{X}}$. From the above relation a joint velocity $\dot{\Theta}_{rk}$ which attains an instructed velocity $\dot{\mathbb{X}}_r$ is determined, and joint velocities $\dot{\Theta}_{rk}$ of the operating joints determined for respective combinations of the redundant joints which can be fixed are summed and averaged as follows.

$$\dot{\Theta}_r = \frac{1}{m} \sum_{k=1}^{m} \mathbb{J}_k^{-1} \cdot \dot{\mathbb{X}}_r\ (\text{where } m \leq {}_nC_{n-3}) \tag{16}$$

It is used as desired velocity $\dot{\Theta}_r$ of the joints to control the redundant robot arm.

In the equation (16), the joint velocities $\dot{\Theta}_{rk}$ for all combinations of the redundant joints to be fixed, that is, all combinations of the operating joints excluding the redundant joints are evenly averaged. Alternatively, a portion of all combinations of the operating joints may be used or the joint velocities $\dot{\Theta}_{rk}$ may be unevenly averaged with different weightings.

When the robot arm is moved in a two dimensional plane, n-2 redundant joints of n joints are fixed to square the matrix $\mathbb{J}$ in the velocity relation to obtain the inverse matrix $\mathbb{J}_k^{-1}$ so that the velocities $\dot{\Theta}_{rk}$ of the remaining two operating joints are determined, and the joint velocity $\dot{\Theta}_{rk}$ and the desired velocity $\dot{\Theta}_r$ are determined in the same manner as that for the three-dimensional movement.

The inverse coordinate transform matrix $\mathbb{J}_k^{-1}$ is the inverse matrix of the coordinate transform matrix $\mathbb{J}_k$ and it can be relatively simply obtained by a routinelike calculation process. On the other hand, the coordinate transform matrix $\mathbb{J}_k$ is uniquely determined from the geometrical structure of the robot arm by determining the joint angles at the start of the operation. Accordingly, the inverse coordinate-transform matrix $\mathbb{J}_k^{-1}$ is routinely obtained and hence the present control method is applicable to a general purpose method being affected by the mechanical structure of the robot.

In the present invention, the average of the summation of the joint velocities $\dot{\Theta}_k$ obtained for the combinations of the redundant robot arm joints which attain the directed end velocity $\dot{\mathbb{X}}_m$ is used as the desired joint velocity $\dot{\Theta}$ of the redundant robot arms. Accordingly, the robot end can be smoothly controlled along the desired trajectory while all joints are synergistically moved. In the present invention, a complex algorithm to determine the angles of the redundant joints is not necessary in calculating the desired joint velocity $\dot{\Theta}$, and the inverse coordinate transformation from the instructed velocity $\dot{\mathbb{X}}_m$ to the joint velocity $\dot{\Theta}_k$ is a relatively simple conventional technique which is not affected by the mechanical structure of the robot. Accordingly, the present invention can be readily applied to the real-time control using a microcomputer.

In the present invention, when the robot end is controlled to be moved by sampling control, the desired velocity is corrected to reduce an error between an actual position of the robot end and the desired position at each sampling time. Thus, an error caused in the velocity control servo mechanism for driving the robot joints due to various losses is corrected and compensated so that a high precision trajectory tracking control is attained.

BRIEF DESCRIPTION OF THE DRAWINGS

These and other objects and advantages of the invention will become apparent by reference to the following description taken in conjunction with the accompanying drawings, in which.

DESCRIPTION OF PREFERRED EMBODIMENTS

Figure 1:
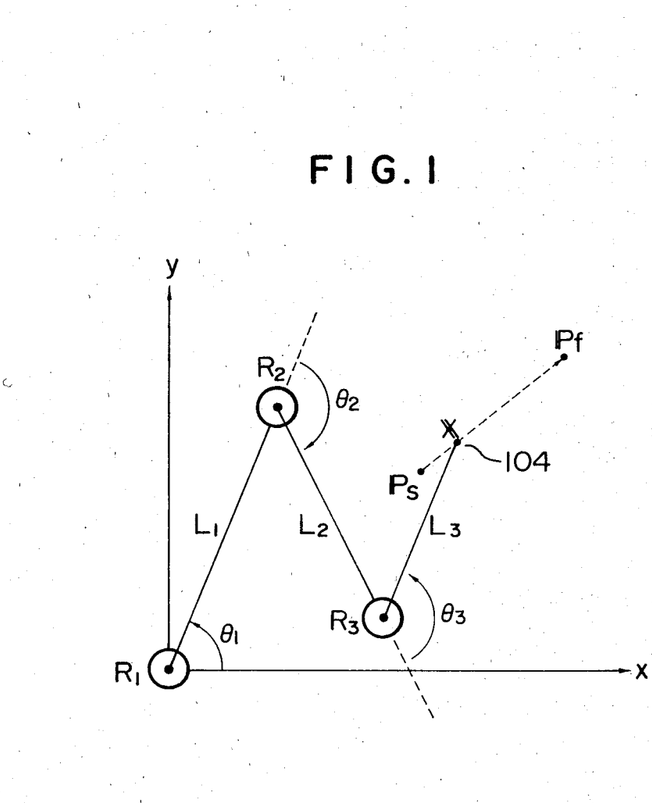
FIG. 1 is a schematic diagram of a mechanical structure of a redundant robot arm in accordance with one embodiment of the present invention.

One embodiment of the present invention is now explained. FIG. 1 is a diagram for explaining a mechanical structure of a redundant robot arm which is to be controlled in the embodiment of the present invention. The redundant robot arm comprises three rotary joints $R_1$, $R_2$ and $R_3$ for positioning in an x-y plane and three links $L_1$, $L_2$ and $L_3$ connected thereto. A base of the link $L_1$, that is, the joint $R_1$ is located at an origin of the orthogonal coordinate xy. The links $L_1$, $L_2$ and $L_3$ have lengths $l_1$, $l_2$ and $l_3$, respectively, and rotation angles of the joints $R_1$, $R_2$ and $R_3$ are $\theta_1$ with respect to the x-axis, $\theta_2$ with respect to the link $L_1$ and $\theta_3$ with respect to the link $L_2$, respectively.

An end position x (x, y) of the robot is expressed by the joint angles $\theta_1$, $\theta_2$ and $\theta_3$ of the robot as follows.

$$\left. \begin{array}{l} x = \sum_{k=1}^{3} l_k \cos\left(\sum_{i=1}^{k} \theta_i\right) \\ y = \sum_{k=1}^{3} l_k \sin\left(\sum_{i=1}^{k} \theta_i\right) \end{array} \right\} \quad (17)$$

Let us assume that $$\left. \begin{array}{l} f_1 = f_1(\theta_1, \theta_2, \theta_3) = \sum_{k=1}^{3} l_k \cos\left(\sum_{i=1}^{k} \theta_i\right) \\ f_2 = f_2(\theta_1, \theta_2, \theta_3) = \sum_{k=1}^{3} l_k \sin\left(\sum_{i=1}^{k} \theta_i\right) \end{array} \right\} \quad (18)$$

The equations (17) are differented with a time t to obtain a velocity relation between the end position $\mathbb{X}$ and the joint angle $\Theta$, $$\left. \begin{array}{l} \dot{x} = \sum_{k=1}^{3} \frac{\partial f_1}{\partial \theta_k} \cdot \dot{\theta}_k \\ \dot{y} = \sum_{k=1}^{3} \frac{\partial f_2}{\partial \theta_k} \cdot \dot{\theta}_k \end{array} \right\} \quad (19)$$

where $$\left. \begin{array}{l} \dot{x} = \frac{\partial x}{\partial t}, \dot{y} = \frac{\partial y}{\partial t} \\ \dot{\theta}_1 = \frac{\partial \theta_1}{\partial t}, \dot{\theta}_2 = \frac{\partial \theta_2}{\partial t}, \dot{\theta}_3 = \frac{\partial \theta_3}{\partial t} \end{array} \right\} \quad (20)$$

Let us assume that $$f_{ij} = \frac{\partial f_i}{\partial \theta_j} \quad (i = 1, 2; j = 1, 2, 3) \quad (21)$$

Then, the equations (19) are represented as $$\begin{bmatrix} \dot{x} \\ \dot{y} \end{bmatrix} = \begin{bmatrix} f_{11} & f_{12} & f_{13} \\ f_{21} & f_{22} & f_{23} \end{bmatrix} \begin{bmatrix} \dot{\theta}_1 \\ \dot{\theta}_2 \\ \dot{\theta}_3 \end{bmatrix} \quad (22)$$

That is, $$\dot{\mathbb{X}} = J \dot{\Theta} \quad (23)$$

where $$J = \begin{bmatrix} f_{11} & f_{12} & f_{13} \\ f_{21} & f_{22} & f_{23} \end{bmatrix} \quad (24)$$

From the equation (23), the desired joint velocities $\dot{\Theta}_r$ of the joints to attain the command velocity $\dot{\mathbb{X}}_m$ to the robot end are determined. In order to compensate for various losses in a servo mechanism for controlling the velocities of the joint angles of the robot, the desired velocity $\dot{\mathbb{X}}_r$ is corrected by a velocity error $\dot{\mathbb{X}}_e$ of the robot end as follows:

$$\dot{\mathbb{X}}_m = \dot{\mathbb{X}}_r + \dot{\mathbb{X}}_e \quad (25)$$

where $$\dot{\mathbb{X}}_m = (\dot{x}_m \; \dot{y}_m)^T \quad (26)$$
$$\dot{\mathbb{X}}_r = (\dot{x}_r \; \dot{y}_r)^T$$
$$\dot{\mathbb{X}}_e = (\dot{x}_e \; \dot{y}_e)^T$$

where the superscript T indicates the transpose of the row vector into a column vector.

Let us assume that the end of the redundant robot arm is linearly moved at a velocity v from a start position $P_s$ ($x_s$, $y_s$) to a desired position $P_f$ ($x_f$, $y_f$) under sampling control at T periods. Assume that the start position $P_s$ is a robot end position $\mathbb{X}_o$ ($x_o$, $y_o$) at time t=0. A desired velocity vector $\dot{\mathbb{X}}_r$ ($\dot{x}_r$ $\dot{y}_r$) is given by $$\left. \begin{array}{l} \dot{x}_r = \frac{x_f - x_s}{l} \cdot v \\ \dot{y}_r = \frac{y_f - y_s}{l} \cdot v \end{array} \right\} \quad (27)$$

$$l = \{(x_f - x_s)^2 + (y_f - y_s)^2\}^{\frac{1}{2}} \quad (28)$$

An error correction velocity $\dot{\mathbb{X}}_e$ ($\dot{x}_e$ $\dot{y}_e$) at an n-th sampling time is given by $$\left. \begin{array}{l} \dot{x}_e = -\frac{x - x_1}{T} \\ \dot{y}_e = -\frac{y - y_1}{T} \end{array} \right\} \quad (29)$$

$\mathbb{X}$ (x, y) is the actual position of the robot end at the n-th sampling time and it is calculated from the joint angles of the robot using the equations (17), and $P_i$ ($x_i$, $y_i$) is a desired position at the n-th sampling time and $x_i$ and $y_i$ are given by $$\left. \begin{array}{l} x_i = \dot{x}_r \cdot nT \\ y_i = \dot{y}_r \cdot nT \\ (n = 1, 2, 3, \ldots, N) \end{array} \right\} \quad (30)$$

where $$N = \frac{l}{vT} \quad (31)$$

Accordingly, by controlling the robot end position $X$ in accordance with the command velocity $\dot{X}_m$ represented by the following equations at the n-th sampling time, $$\left.\begin{array}{l} \dot{x}_m = \dot{x}_r + \dot{x}_e \\ \dot{y}_m = \dot{y}_r + \dot{y}_e \end{array}\right\} \quad (32)$$

the error between the desired position and the actual position of the robot end caused by the various losses in the servo mechanism is corrected and the losses are compensated so that the robot end can precisely follow the desired trajectory.

From the equation (23), the following relation is held between the command velocity $\dot{X}_m$ of the robot end and the desired joint velocity $\dot{\theta}_r$ for attaining the command velocity $\dot{X}_m$.

$$\dot{X}_m = J \dot{\theta}_r \quad (33)$$

Because three unknown quantities $\theta_1$, $\theta_2$ and $\theta_3$ to determine the desired joint velocity $\theta_r$ for the desired command velocity $\dot{X}_m$ are included while the number of equations (19) is two, the solution is not uniquely determined.

Thus, one of the three joints $R_1$, $R_2$ and $R_3$ is fixed as a redundant joint to reduce the number of unknown quantities to two, and the joint velocities to attain the command velocity $\dot{X}_m$ by the remaining two joints are determined. The above operation is repeated for each of all possible cases of the fixed redundant joints, that is, all combinations of the operating joints excluding the fixed redundant joints (one joint in the present embodiment), and the resulting joint velocities are added and averaged to produce the desired joint velocity $\dot{\theta}_r$. The Jacobian $J_k$ for the joint velocities $\dot{\theta}_k$ of the non-fixed operating joints when the joint $R_k$ is fixed and the desired velocities $\dot{\theta}_{rk}$ for the operating joints are represented as follows:

$$\left.\begin{array}{l} J_k = JC_k \, (k = 1, 2, 3) \\ \dot{\theta}_{rk} = C_k^T \dot{\theta}_r \, (k = 1, 2, 3) \end{array}\right\} \quad (34)$$

where the superscript T indicates the transpose of the row vector into a column vector and $$\left.\begin{array}{l} C_1 = \begin{pmatrix} 0 & 0 \\ 1 & 0 \\ 0 & 1 \end{pmatrix} \\ C_2 = \begin{pmatrix} 1 & 0 \\ 0 & 0 \\ 0 & 1 \end{pmatrix} \\ C_3 = \begin{pmatrix} 1 & 0 \\ 0 & 1 \\ 0 & 0 \end{pmatrix} \end{array}\right\} \quad (35)$$

where $C_1$ is a matrix when the joint $R_1$ is fixed and the joints $R_1$ and $R_2$ are used as the operating joints $C_2$ is a matrix when the joint $R_2$ is fixed and the joints $R_1$ and $R_3$ are used as the operating joints, and $C_3$ is a matrix when the joint $R_3$ is fixed and the joints $R_1$ and $R_2$ are used as the operating joints.

By putting $J_k$ and $\dot{\theta}_{rk}$ in the equation (33), the following relation between the command velocities $\dot{X}_m$ of the robot end and the velocities $\dot{\theta}_{rk}$ of the non-fixed joints is derived.

$$\dot{X}_m = J_k \dot{\theta}_{rk} \, (k = 1, 2, 3) \quad (36)$$

Since $J_k$ is squared in the equations (34), the inverse matrix $J_k^{-1}$ can be obtained. Thus, the desired joint velocities $\dot{\theta}_{rk}$ of the two operating joints when the joint $R_k$ is fixed are determined by $$\dot{\theta}_{rk} = J_k^{-1} \dot{X}_m \quad (37)$$

The desired joint velocities $\dot{\theta}_{rk}$ for combination of the two joints determined by the equation (37) are calculated for each of the possible combinations of two joints and they are summed for the respective joint velocities $\dot{\theta}_1$, $\dot{\theta}_2$ and $\dot{\theta}_3$, and they are averaged to obtain the desired joint velocities $\dot{\theta}_r$, as shown below.

$$\dot{\theta}_r = \frac{1}{n} \sum_{k=1}^{n} \dot{\theta}_{rk} \, (n = 3) \quad (38)$$

where $$\dot{\theta}_r = (\dot{\theta}_{1r}, \dot{\theta}_{2r}, \dot{\theta}_{3r})^T$$

From the equations (34), (37) and (38), the desired joint velocities $\dot{\theta}_r$ is given by $$\dot{\theta}_r = \frac{1}{n} \sum_{k=1}^{n} [JC_k]^{-1} \dot{X}_m \quad (39)$$

$$(n = 3)$$

and they are used as input values to the velocity control servo mechanism.

In the above, the joint velocities for all of the possible combinations of the operating joints excluding the redundant joints are averaged to determine the desired joint velocity $\dot{\theta}_r$ as shown in the equation (39). Alternatively, not all of the possible combinations of the operating joints need to be considered but a portion of the combinations may be selected in the following manner. When the total number of the joints of the robot is an even number, each joint is included once in the selected combinations, and when the total number of the joints of the robot is an odd number, each of the joints except one is included once in the selected combinations and the above one joint is included twice in the combinations.

In a redundant manipulator with 4 degrees of freedom, the desired joint velocities can be determined from $$\dot{\theta}_r = \frac{1}{2} \{[JC_{12}]^{-1} \dot{X}_m + [JC_{34}]^{-1} \dot{X}_m\} \quad (40)$$

or $$\dot{\theta}_r = \frac{1}{2} \{[JC_{23}]^{-1} \dot{X}_m + [JC_{14}]^{-1} \dot{X}_m\} \quad (41)$$

or $$\dot{\theta}_r = \frac{1}{2}\{[J C_{24}]^{-1}\dot{X}_m + [J C_{13}]^{-1}\dot{X}_m\} \quad (42)$$

where $$C_{12} = \begin{pmatrix} 0 & 0 \\ 0 & 0 \\ 1 & 0 \\ 0 & 1 \end{pmatrix}, C_{23} = \begin{pmatrix} 1 & 0 \\ 0 & 0 \\ 0 & 0 \\ 0 & 1 \end{pmatrix}, C_{34} = \begin{pmatrix} 1 & 0 \\ 0 & 1 \\ 0 & 0 \\ 0 & 0 \end{pmatrix} \quad (43)$$

$$C_{13} = \begin{pmatrix} 0 & 0 \\ 1 & 0 \\ 0 & 0 \\ 0 & 1 \end{pmatrix}, C_{14} = \begin{pmatrix} 0 & 0 \\ 1 & 0 \\ 0 & 1 \\ 0 & 0 \end{pmatrix}, C_{24} = \begin{pmatrix} 1 & 0 \\ 0 & 0 \\ 0 & 1 \\ 0 & 0 \end{pmatrix}$$

and $C_{12}$ is a matrix when joints $R_1$ and $R_2$ of four joints $R_1$, $R_2$, $R_3$ and $R_4$ of the redundancy manipulator with 4 degrees of freedom are fixed, $C_{23}$ is a matrix when the joints $R_2$ and $R_3$ are fixed, $C_{34}$ is a matrix when the joints $R_3$ and $R_4$ are fixed, $C_{13}$ is a matrix when the joints $R_1$ and $R_3$ are fixed, $C_{14}$ is a matrix when the joints $R_1$ and $R_4$ are fixed, and $C_{24}$ is a matrix when the joints $R_2$ and $R_4$ are fixed. Thus, the equation (40) is for two combinations of the operating joints $R_3$, $R_4$ and $R_1$, $R_2$, the equation (41) is for two combinations of $R_1$, $R_4$ and $R_2$, $R_3$, and the equations (43) is for two combinations of $R_1$, $R_3$ and $R_2$, $R_4$.

In a redundant manipulator, with 5 degrees of freedom the desired joint velocity $\dot{\theta}_r$ can be determined from $$\dot{\theta}_r = \frac{1}{3}\{[JC_{345}]^{-1}\dot{X}_m + [JC_{125}]^{-1}\dot{X}_m + [JC_{123}]^{-1}\dot{X}_m\} \quad (44)$$

where $$C_{345} = \begin{pmatrix} 1 & 0 \\ 0 & 1 \\ 0 & 0 \\ 0 & 0 \\ 0 & 0 \end{pmatrix}, C_{125} = \begin{pmatrix} 0 & 0 \\ 0 & 0 \\ 1 & 0 \\ 0 & 1 \\ 0 & 0 \end{pmatrix}, C_{123} = \begin{pmatrix} 0 & 0 \\ 0 & 0 \\ 0 & 0 \\ 1 & 0 \\ 0 & 1 \end{pmatrix} \quad (45)$$

and $C_{345}$ is a matrix when joints $R_3$, $R_4$ and $R_5$ of five joints $R_1$, $R_2$, $R_3$, $R_4$ and $R_5$ of the manipulator are fixed, $C_{125}$ is a matrix when the joints $R_1$, $R_2$ and $R_5$ are fixed, and $C_{123}$ is a matrix when the joints $R_1$, $R_2$ and $R_3$ are fixed, and the equation (44) is for three combintions of the operating joints $R_1$, $R_2$; $R_3$, $R_4$ and $R_4$, $R_5$.

By selecting the portion of the all possible combinations of the operating joints, although the operation precision is lowered the operation time can be reduced.

On the other hand, in the equation (39), when the matrix $|JC_1|=0$, $|JC_2|=0$ or $|JC_3|=0$ and so $[JC_1]^{-1}$, $[JC_2]^{-1}$ or $[JC_3]^{-1}$ cannot be determined, the desired joint velocity $\dot{\theta}_r$ can be determined from $$\dot{\theta}_r = \frac{1}{2}\{[JC_2]^{-1}\dot{X}_m + [JC_3]^{-1}\dot{X}_m\} \quad (46)$$

$$\dot{\theta}_r = \frac{1}{2}\{[JC_1]^{-1}\dot{X}_m + [J'C_3]^{-1}\dot{X}_m\} \quad (47)$$

or $$\dot{\theta}_r = \frac{1}{2}\{[JC_1]^{-1}\dot{X}_m + [JC_2]^{-1}\dot{X}_m\} \quad (48)$$

The same is applied to a redundant manipulator having a freedom of larger than three.

In the equation (39), the desired joint velocity $\dot{\theta}_r$ is determined by evenly averaging the solutions of the operation joints excluding the redundant joints. Alternatively, the desired joint velocity $\dot{\theta}_r$ can be determined by weighted-averaging the solutions as shown below.

$$\dot{\theta}_1 = \sum_{k=1}^{n} W_k [JC_k]^{-1}\dot{X}_m \quad (49)$$

where, $\sum_{k=1}^{n} W_k = 1$.

In the equation (39), the weightings in the equation (49) are equal, but the weightings may be different.

By unevenly weighting, it is possible to heavily weight combinations of the operating joints in which combinations specific joints are included so that the specific joints are operated at a high priority, or lightly weighting combinations of operating joints in which combinations specific joints are included so that the operation of the specific joints is suppressed. This is effective particularly when an operation range of the specific joints of the robot is limited.

In the present embodiment where the manipulator has the three joints $R_1$, $R_2$ and $R_3$, by setting a weight $W_1$ for the combination having the joints $R_1$ fixed to 0.8, and the weights $W_2$ and $W_3$ for the combinations having the joints $R_2$ and $R_3$ fixed, respectively, to 0.1 so that the weight for the combination which includes the operating joint $R_1$ is lowered, it is possible to suppress the operation of the joint $R_1$.

In the equations (39) and (49), the operating joint velocities $\dot{\theta}_{rk}$ are weighted such that a total of the weights is unity in order to determine the desired joint velocity $\dot{\theta}_r$. However, as described above, since the error correction control for the servo control mechanism as shown is the equation (25) is effected in this invention, it is not necessary to weight the operating joint velocities such that the total of the weights is exactly unity.

Figure 2:
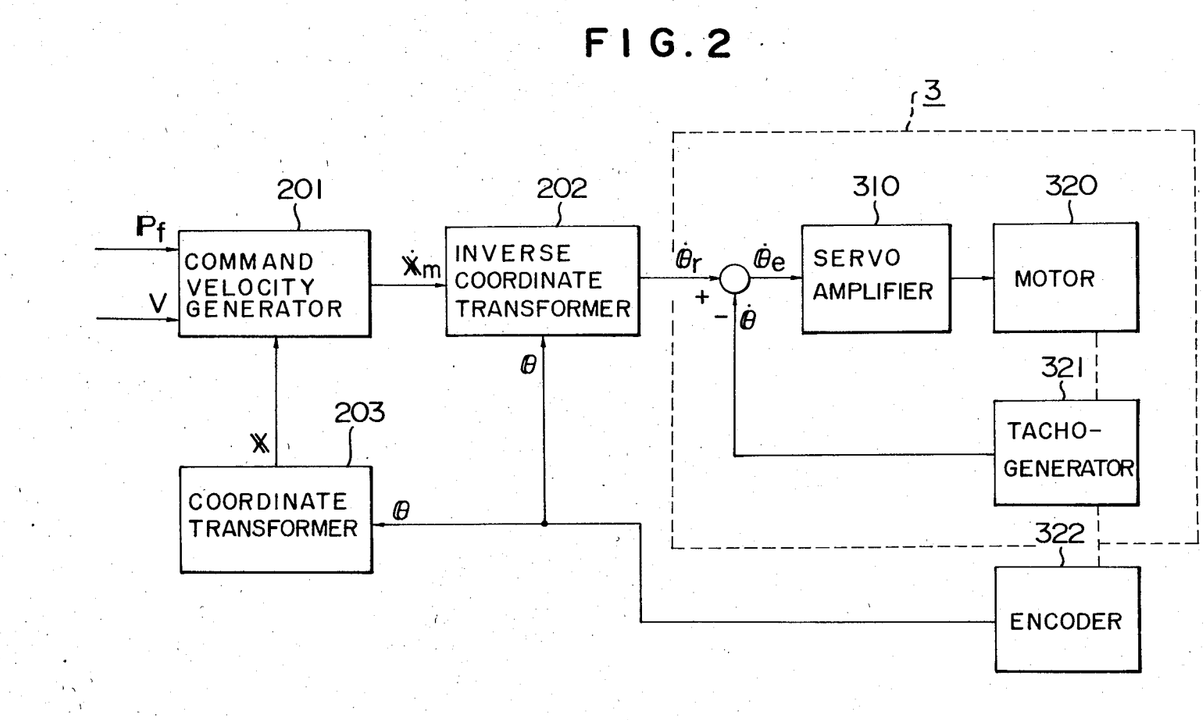
FIG. 2 is a configuration of one embodiment of an apparatus used to control a robot.

FIG. 2 shows a configuration of an apparatus for carrying out the robot control of the present invention. Numeral 203 denotes a coordinate transformer for calculating a current robot end position $X$ in accordance with the equation (17) from the robot joint angle $\theta$ detected by encoders 322 mounted on the joints of the robot. Numeral 201 denotes a command velocity generator for calculating a command velocity $\dot{X}_m$ of the robot end in accordance with the equations (27), (28), (29), (30), (31) and (32) from the current end position calculated by the coordinate transformer 203. Numeral 202 denotes a redundant inverse coordinate transformer for calculating a desired joint velocity $\dot{\theta}_r$ in accordance with the equations (24) and (29) from the command velocity $\dot{X}_m$ from the command velocity generator 201. The element $f_{ij}$ of the matrix $J$ in the equation (24) is a function of the joint angle $\theta$, and so the desired joint velocity $\dot{\theta}$ is calculated on the basis of the current joint angles detected by the encoders 322.

In the present embodiment, the command velocity generator 201, the coordinate transformer 203 and the redundant inverse coordinate transformer 202 are sampled at a sampling period T repeatedly and the sampled signals are processed by a microcomputer. A velocity control servo mechanism 3 comprises servo amplifiers 310, motors 320 and tachogenerators 321 for detecting a rotating speed $\dot{\theta}$ of the motors 320, and functions to drive the motors 320 which rotate the joints respectively in accordance with the input desired joint velocity $\dot{\theta}_r$. Thus, the robot end position $X$ is smoothly and precisely moved toward the desired position $Pf$ at a specified velocity v while all joints are synergistically moved along the desired trajectory $X_r$.

Figure 3:
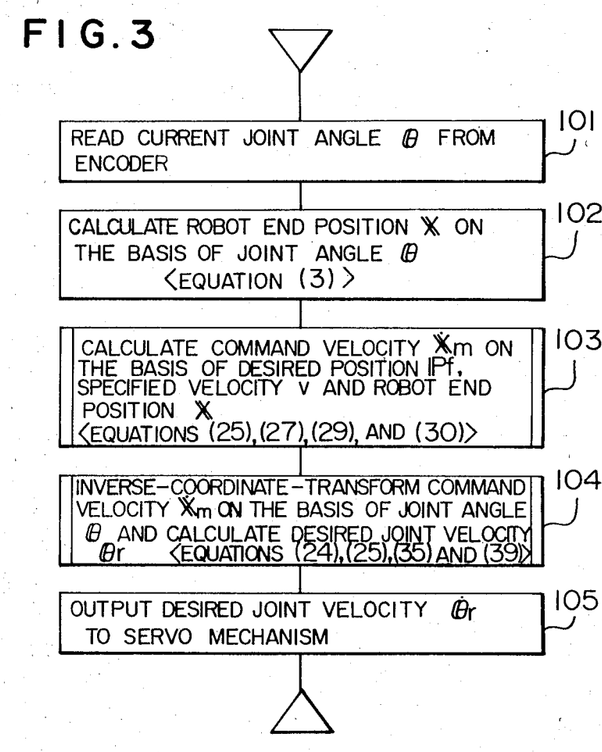
FIG. 3 is a flow chart showing a control procedure of the robot control effected by the apparatus of FIG. 2.

FIG. 3 shows a flow chart of a control procedure for the robot control in the arrangement of FIG. 2.

In a first step of the control procedure, the output signal from the encoder 322 is read in to read the current joint angle $\theta$ (step 101).

In a second step, the robot end position $X$ is calculated in accordance with the equation (3) on the basis of the joint angle $\theta$ (step 102).

In a third step, the command velocity $\dot{X}_m$ of the robot end is calculated in accordance with the equations (25), (27), (29) and (30) on the basis of the specified desired position $Pf$ and velocity v and the end position $X$ calculated in the second step (step 103).

In a fourth step, the desired joint velocity $\dot{\theta}_r$ of the robot is calculated in accordance with the equations (24), (35) and (39) on the basis of the joint angle $\theta$ calculated in the first step and the command velocity $\dot{X}_m$ calculated in the third step (step 104).

Finally, in a fifth step, the desired joint velocity $\dot{\theta}_r$ calculated in the fourth step is supplied to the servo mechanism 3 (step 105).

The above sequence of operations are repeated N times at an interval of the period T so that the robot end is smoothly and precisely moved along the desired trajectory.

The third and fourth steps of the control procedure will now be explained in further detail.

Figure 4:
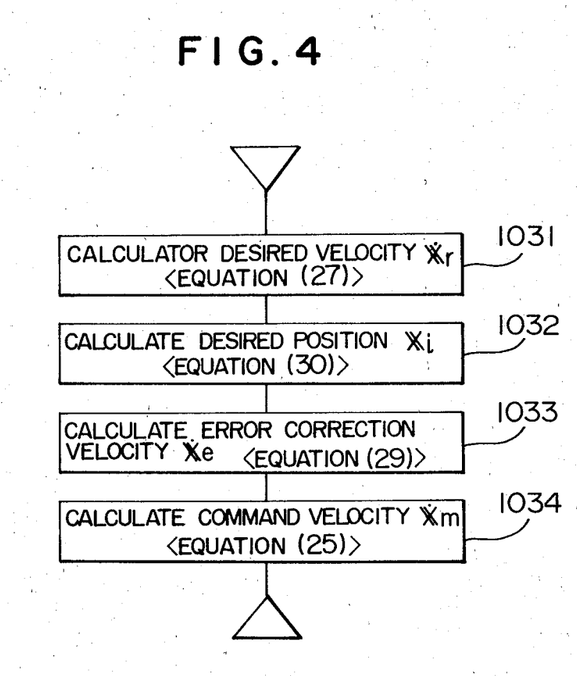
FIG. 4 is a detailed flow chart of a step for calculating a robot end command velocity in the flow chart of FIG. 3.

The detail of the third step is shown in FIG. 4.

In a first sub-step, the desired velocity $\dot{X}_r$ is calculated in accordance with the equation (27) on the basis of the command velocity v and the desired position $Pf$ (step 1031), and in a second sub-step, the desired position $X_i$ is calculated in accordance with the equation (30) on the basis of the desired velocity $\dot{X}_r$ (step 1032). In a third sub-step, the error correcting velocity $\dot{X}_e$ is calculated in accordance with the equation (29) on the basis of the desired position $X_i$ calculated in the second sub-step (step 1033). Finally, the desired velocity $\dot{X}_r$ is corrected by the error correcting velocity $\dot{X}_e$ in accordance with the equation (25) to calculate the command velocity $\dot{X}_m$ (step 1034).

Figure 5:
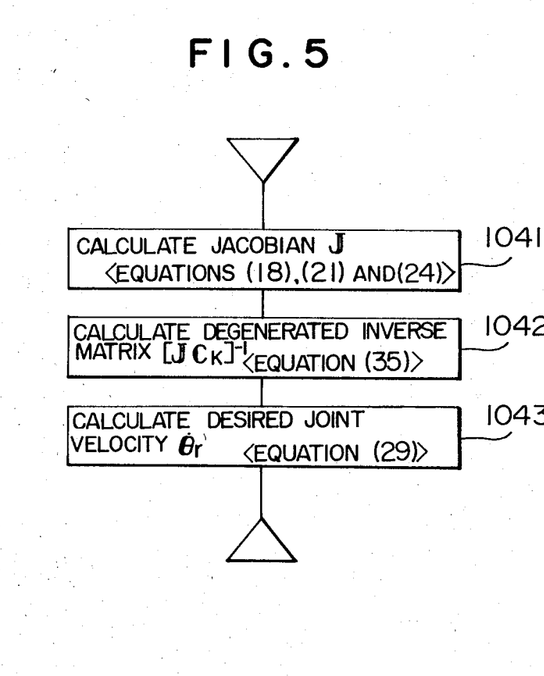
FIG. 5 is a detailed flow chart of a step for calculating a desired joint velocity of the robot in the flow chart of FIG. 3.

The detail of the fourth step is shown in FIG. 5.

In a first sub-step, the Jacobian $J$ is calculated in accordance with the equations (18), (20) and (24) on the basis of the joint angle $\theta$ read in the first main step (step 1041). In a second sub-step, a degenerated inverse matrix $[JC_k]^{-1}$ is calculated in accordance with the equation (35) (step 1042). Finally, in a third sub-step, the desired joint velocity $\dot{\theta}_r$ is calculated in accordance with the equation (29) (step 1043).

The calculations in the first and second sub-steps (steps 1041 and 1042) of the fourth main step can be carried out by developing the degenerated inverse matrix $[JC_k]^{-1}$ with the joint angle $\dot{\theta}$ being a variable and putting the joint angle therein so that the operation time can be further reduced.

The specific control procedure for the robot control method of the present invention has thus far described.

While the robot arm is moved in the two-dimensional plane in the present embodiment, the present invention can be applied to the robot arm moving in a three-dimensional space by expanding the control technique for the two-dimensional robot to the three-dimensional robot control.

While the final position of the robot end and the velocity are specified for the command velocity generator in the present embodiment, it is possible to make such that only the velocity is specified from the external and the robot desired joint velocity $\dot{\theta}_r$ is calculated on the basis of the specified velocity and the current robot joint angle.

We claim:

1. A method for controlling a multi-joint robot having redundant operable joints comprising the steps of:
   (a) calculating joint velocities for non-redundant joints based upon no movement of the redundant joints, for each of at least a portion of combinations formed by selecting different combinations of the non-redundant joints from all operable joints, the joint velocities for the combinations of non-redundant joints being capable of moving an end of the robot at a command velocity specified to the robot in a predetermined spatial coordinate, by an inverse-coordinate-transformation from said spatial coordinate to a joint coordinate inherent to the robot in response to current joint angles detected by encoders mounted on each joint of the robot, an averaging or nearly averaging the joint velocities to obtain an average joint velocity or nearly average joint velocity as a desired joint velocity for the joints; and
   (b) supplying the desired joint velocity to a velocity control unit of the robot as a controlled variable.

2. A method for controlling a robot according to claim 1, wherein combinations of the non-redundant joints are selected such that each of the joints except at most one joint appears once in the combinations and said one joint appears cumulatively in the combinations twice at most.

3. A method for controlling a robot according to claim 1, wherein the joint velocities are calculated for each of all possible combinations of the non-redundant joints.

4. A method for controlling a robot according to claim 1, wherein the joint velocities are averaged with at least a portion of the joint velocities being weighted differently from other joint velocities.

5. A method for controlling a robot according to claim 1, wherein the joint velocities are averaged with the joint velocities being evenly weighted.

6. A method for controlling a robot according to claim 1, wherein said method further includes a step of calculating a current robot and position represented by a predetermined spatial coordinate, and said desired joint velocity includes an error correcting joint velocity for correcting an error between a desired position of the robot end and a position where the robot end is actually positioned during the movement thereof.

7. An apparatus for controlling a multi-joint robot having redundant operating joints comprising:
   encoders mounted on joints of the robot for detecting joint angles of the joints;
   means for calculating joint velocities for non-redundant joints based upon no movement of redundant joints for each of at least a portion of combinations formed by selecting different combinations of the non-redundant joints from all operable joints, the joint velocities for the combinations of non-redundant joints being capable of moving an end of the robot at a command velocity specified to the robot in a predetermined spatial coordinate, by inverse-coordinate-transformation from said spatial coordinate to a joint coordinate inherent to the robot, in response to joint angles supplied from said encoders, and averaging or nearly averaging the joint velocities to produce information of an average joint velocity or nearly average joint velocity as a desired joint velocity for the joints; and a velocity control unit responsive to said desired joint velocity for controlling the robot to attain the desired joint velocity.

8. An apparatus for controlling a robot according to claim 7, wherein said joint velocity means comprises a means for calculating a current robot end position, a means for calculating a robot end command velocity in response to a robot end desired position and a velocity specified to the robot and the calculated current robot position, and a means for calculating the joint velocities for attaining the robot end command velocity for the non-redundant joints with the redundant joints not being moved for each combination of at least a portion of the combinations of the non-redundant joints in response to the joint angles supplied from said encoders, by an inverse-coordinate-transformation from said spatial coordinate to a joint coordinate inherent to the robot and averaging or nearly averaging the joint velocities to produce the average joint velocity or nearly average joint velocity as the desired joint velocity information for the joints.

9. A method for controlling a robot having a plurality of joints comprising the steps of:
 (a) obtaining joint velocities in each of combinations formed by selecting N joints from M joints, wherein the number M is greater than the number N which is the number of joints which are necessary for prescribing the position of an end of the robot by carrying out, for each of the combinations, a step of obtaining joint velocities of the selected N joints which velocities enable realization of a command velocity for movement of the robot end commanded in a predetermined coordinate system, assuming that joints other than the selected N joints are not moved, by an inverse-coordinate-transformation from a spatial coordinate of the predetermined coordinate system to a joint coordinate inherent to the robot,
 (b) averaging joint velocities obtained for the respective combinations to obtain a desired joint velocity for said M joints, and
 (c) supplying the obtained desired joint velocity to a velocity control unit of the robot as a control variable.

10. A method for controlling a robot according to claim 9, wherein when moving the robot end in a plane, the number N of joints for prescribing the position of the robot end is two.

11. A method for controlling a robot according to claim 9, wherein the joint velocities are averaged with the joint velocities being evenly weighted.

12. A method for controlling a robot according to claim 9, wherein step (a) includes calculating a current robot end position represented by a predetermined spatial coordinate, and said desired joint velocity includes an error correcting joint velocity for correcting an error between a desired position of the robot end and a position where the robot end is actually positioned during the movement thereof.

13. A method for controlling a robot according to claim 9, wherein the total number of the joints of the robot is equal to said number M.

14. A method according to claim 9, wherein said step (a) includes obtaining joint velocities for respective ones of all the combinations of selecting N joints from M joints.

* * * * *